United States Patent
Boss et al.

(10) Patent No.: US 9,253,330 B2
(45) Date of Patent: Feb. 2, 2016

(54) AUTOMATICALLY RECORD AND RESCHEDULE CONFERENCE CALLS FOR PLAYBACK BASED UPON CALENDAR INVITATIONS AND PRESENCE MONITORING

(71) Applicant: INTERNATIONAL BUSINESS MACHINES CORPORATION, Armonk, NY (US)

(72) Inventors: Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/194,201

(22) Filed: Feb. 28, 2014

(65) Prior Publication Data

US 2015/0249747 A1   Sep. 3, 2015

(51) Int. Cl.
*H04M 1/64* (2006.01)
*H04M 3/42* (2006.01)
*H04M 3/56* (2006.01)

(52) U.S. Cl.
CPC ............ *H04M 3/56* (2013.01); *H04M 3/42221* (2013.01)

(58) Field of Classification Search
CPC ................... H04M 2203/654; H04M 2250/62; H04M 3/42221; H04M 3/56; H04M 3/565
USPC ........................ 379/202.01–206.01, 266.1, 85
See application file for complete search history.

(56) References Cited

U.S. PATENT DOCUMENTS

| | | | |
|---|---|---|---|
| 6,993,120 B2 | 1/2006 | Brown et al. | |
| 7,065,198 B2 | 6/2006 | Brown et al. | |
| 7,107,312 B2 | 9/2006 | Hackbarth et al. | |
| 7,139,798 B2 † | 11/2006 | Zircher | |
| 7,170,991 B2 | 1/2007 | Shaffer et al. | |
| 7,299,257 B2 | 11/2007 | Boyer et al. | |
| 7,349,944 B2 | 3/2008 | Vernon et al. | |
| 7,539,086 B2 | 5/2009 | Jaroker | |
| 7,679,518 B1 | 3/2010 | Pabla et al. | |
| 2004/0081292 A1 | 4/2004 | Brown et al. | |
| 2004/0081295 A1 | 4/2004 | Brown et al. | |
| 2004/0184586 A1* | 9/2004 | Coles ................. | H04L 12/2854 379/88.14 |

(Continued)

OTHER PUBLICATIONS

Affeit, "Conference Call Transcripts", Online, vol. 28, No. 1, Jan./Feb. 2004, pp. 27-28.

(Continued)

*Primary Examiner* — Solomon Bezuayehu
(74) *Attorney, Agent, or Firm* — Scully, Scott, Murphy & Presser, P.C.; Jeff Tang, Esq.

(57) ABSTRACT

There are provided a system, a method and a computer program product for managing conflicts with an attendee not able to join a conference call. The system schedules one or more conference calls and identifies a conflict between the schedules of the conference calls. The system automatically updates a corresponding user's electronic calendar based on the scheduled conference calls and schedules a bot to attend a conflicting conference call instead. The system records the conflicting conference calls that the bot attends. The system stores, in a storage device, the recorded conference calls as one or more files. The system schedules a follow up time for the attendee to listen to the recording.

19 Claims, 6 Drawing Sheets

(56) References Cited

U.S. PATENT DOCUMENTS

| | | | |
|---|---|---|---|
| 2005/0027805 A1† | 2/2005 | Aoki | |
| 2007/0115919 A1* | 5/2007 | Chahal | H04L 29/06027 370/352 |
| 2007/0239832 A1* | 10/2007 | Alperin | G06Q 10/109 709/206 |
| 2010/0017245 A1* | 1/2010 | Kristiansen | G06Q 10/02 705/5 |
| 2010/0223389 A1† | 9/2010 | Ananthanarayanan | |
| 2011/0038472 A1 | 2/2011 | Gartner et al. | |
| 2011/0103568 A1 | 5/2011 | Gartner et al. | |
| 2012/0314849 A1* | 12/2012 | LeBlanc | H04M 3/42221 379/88.23 |
| 2012/0321062 A1 | 12/2012 | Fitzsimmons et al. | |
| 2015/0051934 A1* | 2/2015 | Chakra | G06Q 10/1097 705/7.21 |

OTHER PUBLICATIONS

Chernich et al., "VIRGIL—Providing Institutional Access to a Repository of Access Grid Sessions", Research and Advanced Technology for Digital Libraries, Proceedings 11th European Conference, ECDL 2007, Sep. 16-21, 2007, pp. 174-185.

Internet Society, "Conferencing Scenarios (RFC4597)", The Internet Society (2006), Aug. 1, 2006, An IP.com Prior Art Database Technical Disclosure, IP.com No. IPCOM000139273D.

Disclosed Anonymously, "Intelligent Schedule Additional Meeting for Recording and Live Question and Answer (Q/A)", May 21, 2012, An IP.com Prior Art Database Technical Disclosure, IP.com No. IPCOM000218105D.

\* cited by examiner
† cited by third party

AUTOMATICALLY RECORD AND RESCHEDULE CONFERENCE CALLS FOR PLAYBACK BASED UPON CALENDAR INVITATIONS AND PRESENCE MONITORING

BACKGROUND

This disclosure relates generally to managing one or more conference calls, and particularly to recording one or more conference calls and playing the recording later during an available time period.

BACKGROUND OF THE INVENTION

It is not possible for a user to participate in all the meetings and conference calls that the user has been requested to attend or desires to attend. By not attending the meeting(s), the user is unable to obtain information from the meeting(s). Furthermore, most of moderators or chairpersons of the conference calls forget to record the conference calls or the meetings. Therefore, the user cannot obtain the recording of the conference calls or the meetings. When there exists a conflict between two or more conference calls, the user may miss one or more conflicting conference calls in order to participate in other conference calls.

SUMMARY

There are provided a system, a method and a computer program product for managing a conference call are provided. The system schedules one or more conference calls. The system automatically updates a corresponding user's electronic calendar based on the scheduled conference calls. The system records the conference calls. The system stores, in a storage device, the recorded conference calls as one or more files.

The system configures a bot to represent the corresponding user and perform automated tasks for the user (e.g., attending the conference calls, recording the conference calls and automatically scheduling playback of the recording for the user).

The bot performs a real time transcript of the conference calls in which the software piece is present. The bot provides the transcript to corresponding user via one or more instant messages or emails, in response to which the user may attend the conference.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

Figure 1:
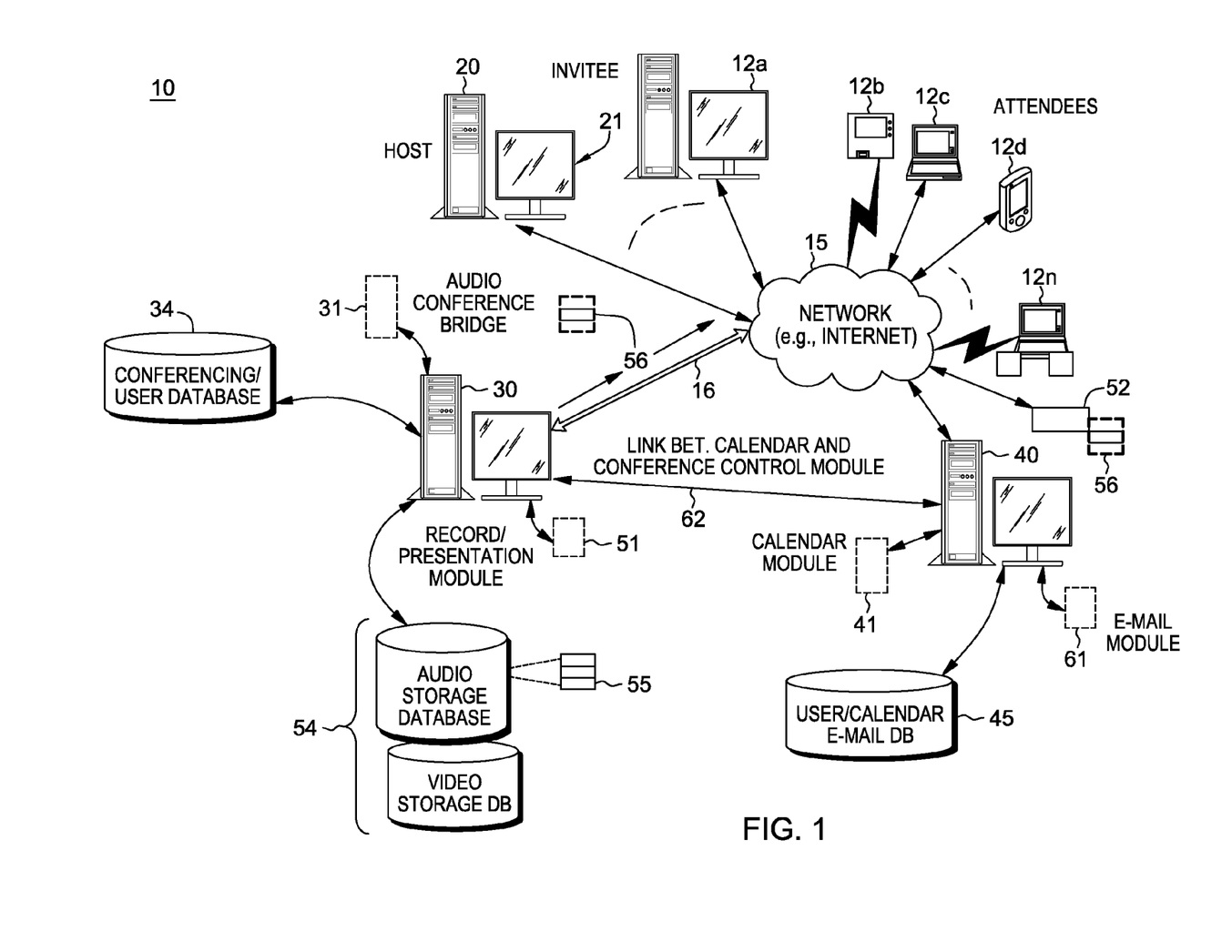
FIG. 1 illustrates an exemplary environment which includes one or more conferencing systems and client devices that include one or more electronic calendars in one embodiment.

FIG. 1 is a diagram illustrating a communications network based, e.g., Internet/Web-based, conferencing system 10 established for reserving and enabling collaborative and/or on-line (audio only or audio/video) teleconferencing and other functionality described herein. As shown in FIG. 1, the conferencing system 10 comprises a computing device, including a control workstation or server 30, equipped with software applications and hardware to provide secure on-line connection service either through a local network, or over the Internet 15. The system can include multiple servers, e.g., a server farm having one or more web/database servers, for example, wherein the control server 30 provides conferencing and other application functions for one or more on-line users, e.g., represented by user client devices 12*a*, . . . 12*n* which may be a computer, mobile computer, smart phones, personal digital assistants, or other personal digital devices or like device implementing a web-browser providing functionality for linking to a conference.

The conferencing system 10 includes known elements configured to enable any type of meeting in which several people or parties (attendees) can communicate using voice and/or data sent via connections established using separate or shared electronic networks.

FIG. 1 shows the first control server 30 providing a conference calling system. More particularly, control server 30 provides for a conferencing session as may be initiated or scheduled by a presenter or session host, e.g., represented by a client device 20, for attendance by the one or more attendee (invitee) clients via their computing devices 12*a*, . . . 12*n*. A single user's calling device is alternately referred to as client device 12. In an embodiment, this session is established over the Internet 15; however, this functionality may be provided within a local network (LAN) or private intranet within an organization. Accordingly, the use of the Internet 15 as an exemplary computer network used for example purposes of illustration should not be construed to limit the scope or breadth of the present invention. The host client computer 20 and the attendee client devices 12*a*, . . . 12*n* may be any suitable computer such as a personal computer ("PC") or a laptop computer, each having a display, such as a video monitor or flat panel display for presentation, or a mobile phone (VoIP or POTS) or mobile computing device.

In one embodiment, call conferencing features of the present invention are facilitated by the use of the control server 30, which provides conferencing control functionality for an audio conferencing bridge module 31 that enables the real-time conferencing communications among the host client 20 and one or more attendee clients 12*a*, . . . , 12*n*. Accordingly, the host client 12 has an active control (not shown) which includes a small application program running on the host's presenter client 21 to communicate with the conferencing bridge on the control server 30. This communication can take place via a computer network, such as the Internet 15.

Similarly, each one or more attendee client devices 12a, ..., 12n, include software functionality that allows the attendee client's device or (VoIP or POTS) phone to partake in an audio teleconference. In teleconferencing, users communicate over the audio conferencing bridge 31 as programmed by the control module on a control server 30. In one embodiment, the communication between audio conferencing bridge 31 implemented in communication with the control server and the host client 12, and the one or more attendee clients 12a, ..., 12n takes place through a computer network, such as the Internet 15. Such communications are provided by VoIP communications. Network 15 may also comprise an Intranet, LAN, WAN networks, etc. Thus, FIG. 1 depicts an Internet based infrastructure implementing the system and methods described herein to modify an audio conferencing infrastructure in which the moderator or host client 20 and the attendee client(s) 12 use software functions to communicate with the control server 30 over a network such as the Internet 15.

Generally, the control server 30 implements functionality to provide an audio conferencing bridge services 31 enabling remote and desktop users for voice and data conferencing communications, and may include technology configured to support video conferencing including audio and/or standard and high-definition video for viewing both meeting participants and data collaboration. A database 34 storing information pertaining to user attendees/invitees of the organization or entity conference may be accessed by the control server 30. In operation, users via their client devices 12a, ..., 12n may click on a link, e.g., via an e-mail notification message or a user's calendar entry, for connection to a scheduled conference. The system provides automatic firewall traversal (firewall not shown) to allow invitees to participate regardless of their location.

Further shown as running on a separate calendaring server 40 (or in other embodiment, running on the control server 30 itself) is a calendar database system module 41 that enables calendaring server 40 to provide services to allow individual users, invitees who may be persons operating one of clients 12a, ..., 12n, to maintain individual electronic calendars on system 10. The information regarding each individual user's electronic calendar is maintained as user calendar data in a user calendar database 45. More specifically, user calendar database 45 generally includes one or more data structures that hold data indicating a user/invitee and zero or more appointments for that user, including data indicating a start date and time and stop date and time for the appointment.

It is understood that wired communications between and amongst the servers 30 and 40 and any of the user clients 12a, ..., 12n may be via the public Internet 15 in accordance with standard TCP/IP protocols and optionally, over a secure communications link, e.g., secure sockets layer or similar protocol.

The calendaring services provided by calendar module 41 of the server 40 (forming a calendar database system) can be accessed using electronic calendaring applications (not shown) residing on client devices 12a, ..., 12n. Calendar database system on server 40 can accept individual electronic calendar appointments for each individual user's electronic calendar, and each of the accepted appointments may include a start date/time and either a stop time or duration of the appointment on a particular day or days. Calendaring server 40 may further store and access information related to a calendar of events for users of clients 12a, ..., 12n.

In a further embodiment, server 40 may further provide electronic "e-mail" services infrastructure provided by an e-mail program module 61 of the server 40 (forming a functional e-mail system). In one embodiment, electronic "e-mail" services infrastructure is integrated as part of or within the calendaring system, or is operated separate there from. E-mail programs, such as Microsoft Outlook™ or Exchange™ provided on client devices 12a, ..., 12n can be used to access/receive and generate/send e-mails via server 40 to any recipient via network 15.

The calendar/e-mail system module 41 via server 40 can also be configured to allow a user, e.g. a host, via a host computing device 20, to operate an electronic calendaring application to organize a meeting by specifying a time, a date, a duration, and a list of invitees, e.g., attendees, for the meeting for the users individual electronic calendars on their devices 12a, ..., 12n, and send electronic messages notifying each invitee of the meeting and allowing them to accept or decline participation in the meeting. Calendar database system 40 can further be configured to add an appointment that corresponds to the meeting to the individual electronic calendar of each user specified.

In FIG. 1, there is provided a further illustrative embodiment of a teleconference call record/playback infrastructure which may be incorporated in the services functionality of the control server 30 or another server device. For purposes of illustration, control server device or computer 30 includes an associated record playback control module 51 configured to run software that manages recording and storage of audio conference calls, audio or audio/video collaborative presentations, etc., rendering control server 30 as a media server. The recordings of audio conference calls, or audio/video data may be stored as files 55 on one or more connected memory storage devices 54 in communication with the control server 30. Associated record playback control module 51 is further responsive to signals for accessing and delivering prior recorded/stored audio conferencing playback file 55 through network 15 for replay on a user's playback device associated with client device 12a, ..., 12n, which may, for example, be a computing device including a video monitor or flat panel display and/or audio speakers 52 associated with the user/invitee client device 12 for presentation. For example, the playback client 52 shown in FIG. 1 may include a media player application such as Windows Media Player, or QuickTime Player available from Apple Computer of Cupertino, Calif.

Particularly, when a conference call is scheduled, via the control module 51, the host may exercise an option to initiate functionality to record the call or not via control functionality provided by record/playback server 50. In the case of a recorded call conference, the call content may be stored on a media storage device 54 connected with the control server 30, which may include memory storage devices for storing audio files, video presentations or both as playback files 55 that are to be subsequently played back on a playback client device. A playback file 56 can contain a recording of media presented during a collaborative communication or teleconference session as shown as the final recording file 55 in FIG. 1. As shown, the system 10 of FIG. 1 illustrates an embodiment where the file 55 stored on a storage device 54 under control of module 51 is configured as playback file 56 that is delivered or streamed via a communication path 16 to a playback client 52 through network 15.

The playback client 52, in an example embodiment, may also be connected to the playback server 20 and 30 through a network 15, such as the Internet 15. In one embodiment, the playback client 52 may receive for replay a file of a conference call session after it has been recorded. Typically, after a conference call is being broadcast, e.g., over the Web, when the session is complete and the audio and/or visual events have been recorded, the playback client 52 is available to enable a user to later review the session. Thus, FIG. 1 depicts an example of a playback client 52 replaying a previously recorded conference call, an audio file 56, over a network 15.

Further, via instructions provided in software control modules 31, 41 and 51, each of server devices 30 and calendar server 40 are in communication with each other to enable the functionality as described herein below. For example, control and record/playback server 30 communicates with calendar/e-mail server 40 via a network communications link 62.

It should be understood that the infrastructure shown in FIG. 1 is illustrative, and not limiting. Several network configurations and connection methods can be employed without departing from the description herein. For example, all functionality described herein may be consolidated in a single server device and a single memory storage device.

For purposes of description, a "bot" or a "proxy agent" which is a computer program component (a specialized software agent) operating on computer systems and communicated over a communications infrastructure. In one embodiment, a bot may implement voice over IP (VoIP) or like communications technology.

Via the example infrastructure of FIG. 1, each of the conferencing control module 31, e-mail/calendar control module 41 and record/playback control module 51 respond to a 'bot' providing instructions configuring a server 30 and/or servers 40 to perform and provide functionality described herein.

Figure 5:
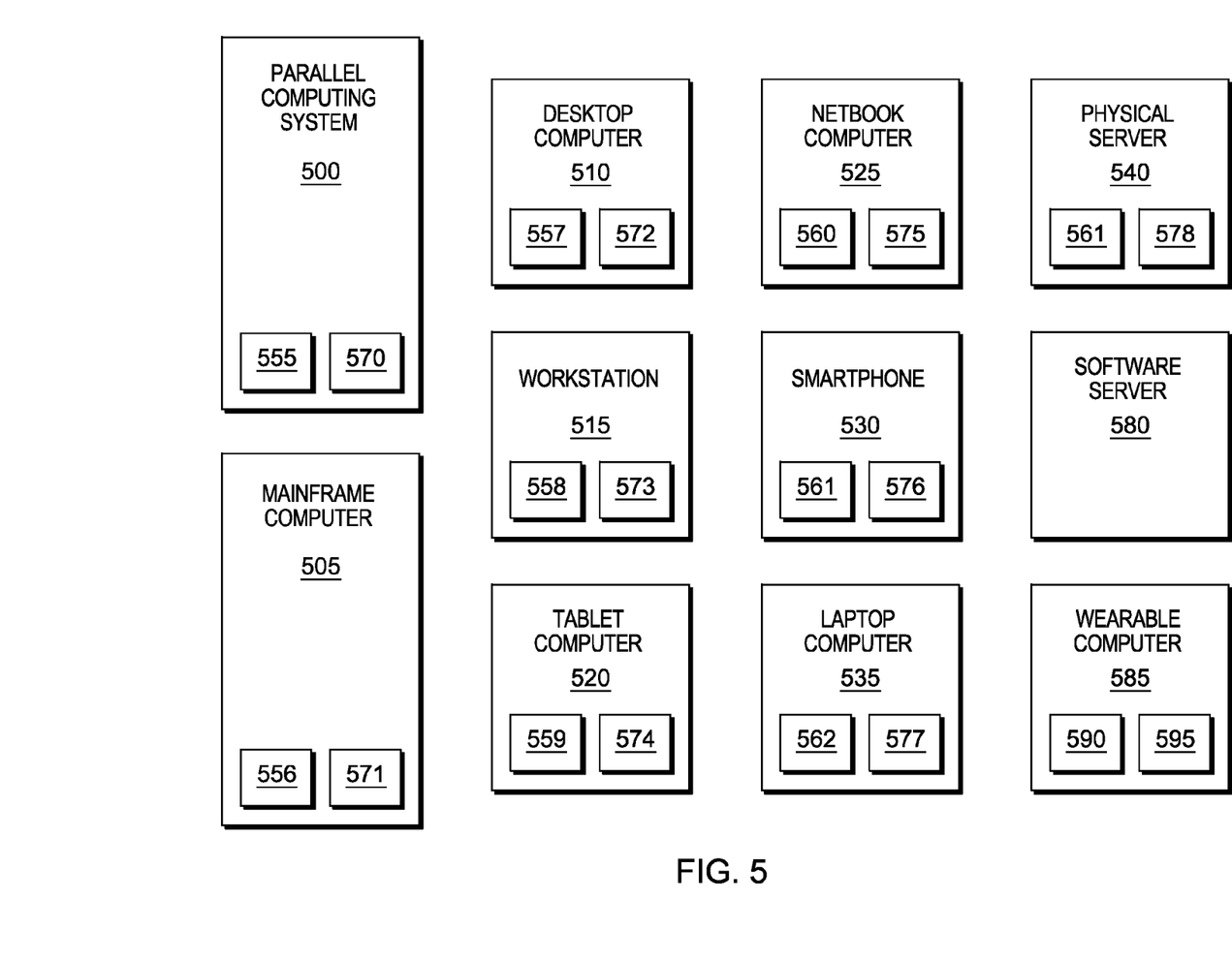
FIG. 5 illustrates exemplary hardware configurations for performing method steps shown in FIGS. 2A-4 in one embodiment.

In one embodiment, a system (e.g., a computing system as shown in FIG. 5) makes intelligent decisions, e.g., by using a machine learning technique—a decision tree, supervised learning, etc., on behalf of a user regarding the recording of conference calls for which the user is not able to attend. For example, upon checking one or more electronic calendar entries of the user, the system may decide to record one or more conference calls. During the one or more conference calls, the user may perform tasks other than attending the one or more conference calls.

The system allows a conference call (or video call) user an opportunity to receive information (i.e., contents) of that conference call whether or not a moderator (i.e., a host for the conference call) decides to record the conference call. For example, even if the host of the conference call does not allow recording of the conference call, the user may send a bot (also called "proxy agent") to a corresponding on-line electronic meeting. The bot may include, but is not limited to: an Internet software robot, i.e., a software application that performs automated tasks over one or more networks. The bot may record the conference call on behalf of the participant. The bot may be written by a high-level programming language, a script, an assembly language, and/or binary code. The bot may further include, but is not limited to: a digital audio recorder, a digital video recorder, an avatar that represents the participant, a speech recognition software program that converts audio and/or a video data to texts, a transcribing software program, VoIP (Voice over IP), a technology to automatically configuring a conference call, an automatic log-in technology to automatically participate in an on-line electronic meeting on behalf of the user, other software functionalities. Upon determining that the user cannot attend the conference all, the user may, for example, press an icon that appears on a corresponding electronic calendar entry of the participant. In response to the pressing the icon, e.g., via a communication signal that encodes the pressing the icon, the bot may appear on the on-line electronic meeting. In one embodiment, the host may not recognize the absence of the user in the on-line electronic meeting because the bot may represent the attendance of the participant. During the on-line electronic meeting, the user may perform one or more tasks instead of actually attending the on-line electronic meeting. Upon the host finishing the on-line electronic meeting, the bot may send the recording to the user, e.g., by an email attachment (for example, an audio file, etc.), a text that transcribes the contents of the on-line electronic meeting. The bot may include an interface that the user can control. Through the interface, the user may indicate what portions (or what parts) of the meeting to be recorded. The bot may record only those portions or those parts of the meeting.

In another embodiment, the host may recognize the absence of the user upon identifying the bot, which represents the user, in the on-line electronic meeting (software or hardware) tool. In this embodiment, if the user actually attends the on-line electronic meeting, the on-line electronic meeting may present a software agent that may include the same feature as like the bot that appears during the absence of the user in the meeting. The distinction between the bot and the software agent may include, but is not limited to: each different color, each different functionality (e.g., instant messaging feature may exist in the software agent in the way the user can communication in real-time with other meeting participants via the instant messaging), etc.

In a further embodiment, upon receiving the recording, the electronic calendar of the user, e.g., IBM® Lotus® Notes®, etc., may automatically schedule a date and time to playback the recording for the user. For example, the electronic calendar may make an entry in the electronic calendar in an available time slot during which the user has not make any entry. The duration of the made electronic calendar entry may be longer than or equal to the duration of the on-line electronic meeting. The electronic calendar system, which may integrate an electronic email system, may be able to identify the duration of the on-line electronic meeting based on corresponding file attachment information. For example, tag (or tag field) data of a MP3 file may include time duration necessary to playback the MP3 file. The electronic calendar of the user may play the recording in an automated fashion, e.g., by automatically starting a multimedia player at the beginning of the available time slot. The electronic calendar may notify the user prior to playing the recording, e.g., 10 minutes prior to playing the recording as scheduled to a corresponding date and time as indicated on the made electronic calendar entry. The bot may provide a conference call (or video call) user an opportunity to receive the information of the conference call whether or not the conference call host decides to record the conference call or not. In a further embodiment, the electronic calendar of the user may embed the recording, e.g., MP3 file, in the made electronic calendar entry. Alternatively, the electronic calendar of the user may post a link (e.g., hyperlink, etc.) to the recording in the made electronic calendar entry.

Figure 6:
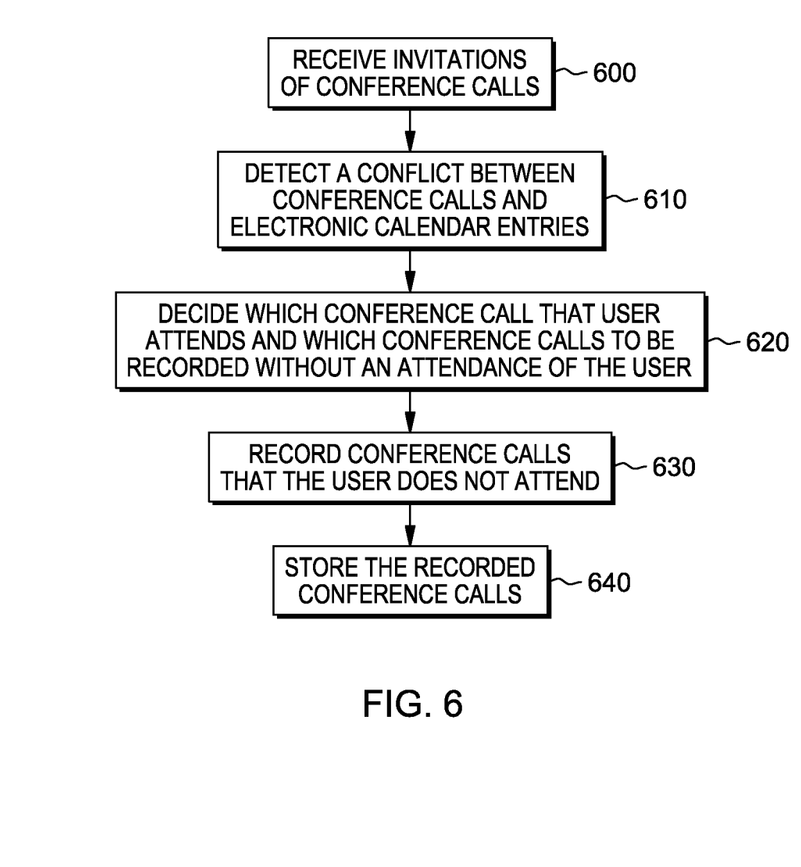
FIG. 6 illustrates a flowchart that describes method steps for managing one or more conference calls in one embodiment.

FIG. 6 illustrates a flowchart that describes method steps for managing a conference call. At 600, the user receives invitations of one or more conference calls. Alternatively, the electronic calendar may automatically accept electronic conference call invitations regardless of the user's schedules posted on the electronic calendar. At 610, the electronic calendar automatically detects a conflict between the one or more conference calls and electronic calendar entries.

At 620, the user decides which conference call the user attends and which conference calls to be recorded without an attendance of the user when there exists the detected conflict. For example, if the user chooses not to attend an on-line electronic meeting, e.g., by selecting "no" button or option on the notification, the electronic calendar may automatically send a communication signal that requests that user's bot appears and/or attends during the meeting. The bot records the conference call(s) that the user does not attend. Alternatively, the communication signal automatically triggers an automatic event that automatically initiates the these conference calls to be recorded. At 630, the bot may provide the recording of those conference calls to the user, e.g., by email attachment. The user may store the recording, for example, in a storage device. Alternatively, the electronic calendar which integrates the electronic email system may automatically store the email attachment (i.e., the recording) in one or more file folders designated by the user. The user may be able to choose a playback of the recording whenever the user wants. Alternatively, the user may not play the recording at all but may still store the recording, e.g., MP3 file, in a storage device of the user.

In a further embodiment, the bot monitors whether the user joined the conference calls that the bot attends, e.g., by detecting that a caller ID of the user appears in a corresponding conferencing system.

In another embodiment, the audio/video conferencing system integrates functionalities of the bot. In this embodiment, the electronic calendar of the user directly and automatically communicates with the conferencing system to have the one or more conference calls recorded, and then sends the recording to an electronic repository, e.g., a database, etc., or directly to the user requesting the recording. In one embodiment, the electronic calendar of the user embeds the recording or a link of the recording in an electronic calendar entry. In this embodiment, an interface of the conferencing system and an interface of the electronic calendar can communicate each other, e.g., by exchanging data packets, etc., and are compatible.

Figure 2A:
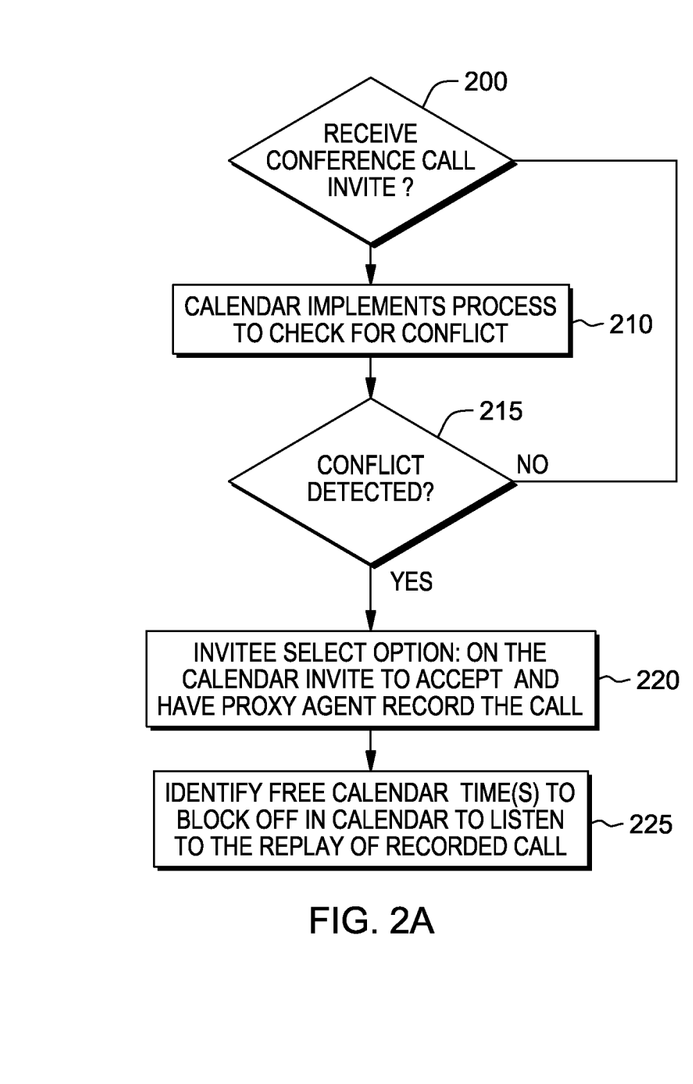
FIG. 2A illustrates a flowchart that describes method steps for recording, by a software piece, a conflicting conference call in one embodiment.
Figure 2B:
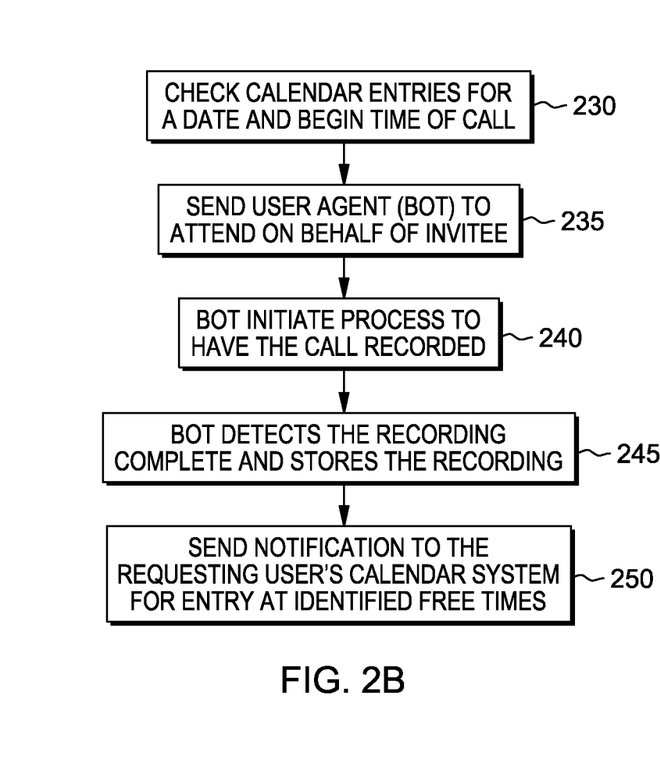
FIG. 2B illustrates a flowchart that describes method steps for requesting to make an electronic calendar entry to listen to the recording in one embodiment.

FIG. 2A illustrates a flowchart that describes method steps for recording, by the bot, a "conflicting" conference call where the user is unavailable to attend an electronic conference call due to a scheduling conflict in one embodiment. FIG. 2B illustrates a flowchart that describes method steps for requesting to make an electronic calendar entry to listen to the recording in one embodiment. At 200 of FIG. 2A, the electronic calendar of the user receives a conference call invitation, e.g., via an on-line electronic meeting invitation. At 210-215 of FIG. 2A and at 230 of FIG. 2B, the electronic calendar evaluates whether there exists a conflict between user's scheduled entries posted on the electronic calendar and a schedule of the conference call. For example, the electronic calendar evaluates whether there exists an overlap between a date and time of the conference call and schedules of the user. Upon detecting no overlap between the date and time of the conference call and schedules of the user, i.e., a conflict, the control returns to step 200 to monitor receipt of a new conference call invitation. The electronic calendar makes an entry corresponding to the date and the time of the conference call.

At 220 of FIG. 2A, upon detecting the conflict at 215, the electronic calendar or the user accepts the invitation. At 235 of FIG. 2B, the electronic calendar sends a communication signal to a corresponding conferencing system to make the bot appear in the conferencing system during the conference call. At 240 of FIG. 2B, the bot records, fully or partially, the conference call. At 245 of FIG. 2B, upon the host completing the conference call, e.g., by host's pressing a "finish" button in the conferencing system, the bot finishes the recording, sends the recording to an electronic repository of the user, and stores the recording in the electronic repository. At 250 of FIG. 2B, the bot sends an electronic notification that requests to create an electronic calendar entry for the recording.

At 230 of FIG. 2A, the bot further sends the recording to the electronic calendar. The electronic calendar finds free times of the user, e.g., based on electronic calendar entries made by the user or the electronic calendar. Upon finding free times that fit to the duration of the recording, the electronic calendar automatically makes an entry in the electronic calendar to make the user to listen to the recording. The electronic calendar prevents the user and the electronic calendar to enter tasks during a date and time of the made electronic calendar entry.

In one embodiment, the conferencing system may prevent the bot from recording the conference call, e.g., by disabling an integration of the bot in the conferencing system or by overriding functionalities of the bot with other functionalities. A conference call chairperson can specify when sending the on-line electronic meeting invitation that the bot or recordings of the meeting are not permitted.

In one embodiment, upon receiving on-line electronic meeting invitations, the electronic calendar or the user detects a conflict between user's schedule and the on-line electronic meeting. Upon detecting the conflict, the user decides which on-line electronic meetings the user attends and which on-line electronic meetings are to be recorded.

In one embodiment, the bot monitors whether or not the user has joined the conference call, e.g., during or beginning of the conference call, e.g., by detecting a voice of the user by using a known voice recognition technique, etc. In one embodiment, the bot automatically calls in the conference call number and fully or partially records the conference call for the user.

The electronic calendar of the user configures the bot to appear in (or attend) the on-line electronic meeting (software or hardware) tool during the on-line electronic meeting. The bot perform a real-time transcript of the contents of the meeting, e.g., by using a known electronic transcription software, etc. The bot provides the real-time transcript to the user via one or more instant messages or one or more emails. By reviewing the real-time transcript, the user may decide whether to temporarily join the meeting that the bot attends. If the user joins the meeting in the middle of the meeting, the bot may disappear and the software agent may appear in the on-line electronic meeting (software or hardware) tool to indicate the attendance of the user.

The electronic calendar of the user may allow a priority setting: for example, an on-line electronic meeting invitation from a particular person may have the highest priority and therefore overrides tasks scheduled during that on-line electronic meeting. Each recording may have a different priority. The electronic calendar may schedule a higher priority recording to be listened by the user before the user listens to a lower priority recording. The user may determine the priority setting, e.g., by user's preference. The user may be able to change the priority setting anytime, e.g., via a graphical user interface (not shown) of the electronic calendar. The user may or may not listen the recording(s) according to schedules determined by the electronic calendar or the user.

The bot may to request the user to answer or respond to questions directed to the user by a specific date, e.g., by sending a communication signal to the electronic calendar that lets the electronic calendar make an electronic calendar entry. The made electronic calendar entry may indicate a hard or flexible deadline to answer to the questions. The user may answer to the questions, e.g., by using an email or an electronic text (message).

The electronic calendar of the user that allows the user to make the bot appear on a conference call/video/web meeting (software or hardware) tool to record one or more aspects of the meeting (contents of the meeting, transcription of the contents of the meeting, length of the meeting, who attended during the meeting, etc). The bot sends the recording to an information repository (e.g., database, etc.), either local or remote, and provides a link to the recording (or a corresponding file of the recording) to the user who did not attend the meeting.

Figure 3A:
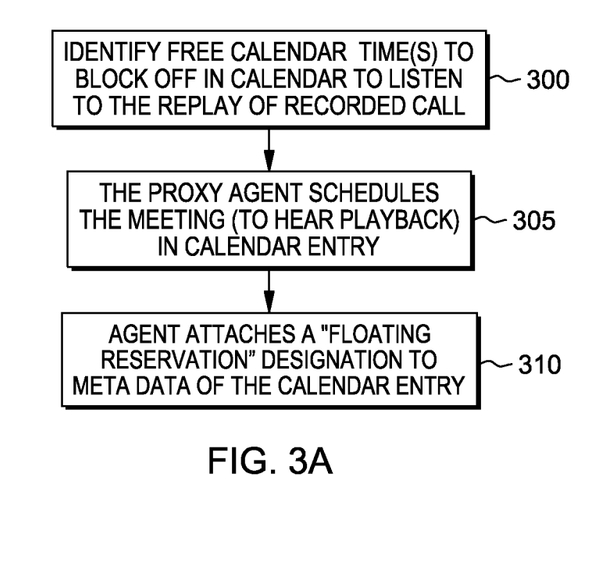
FIG. 3A illustrates a flowchart that describes method steps for making a flexible electronic calendar entry by which a date and time to listen the recording can be changed in one embodiment.

FIG. 3A illustrates a flowchart that describes method steps for making a flexible electronic calendar entry by which a date and time to listen the recording can be changed in one embodiment. At 300-305, the electronic calendar of the user uses a predetermined allocation mechanism (e.g., allocating user's listening of the recording to a next available open time slot on the user's electronic calendar) and creates a calendar event reserving the next available open time slot so that the user can be listened to the recording during the next available open time slot. The priority settings and answers requested by the meeting host may influence when a make-up call can be scheduled. For example, prior to the deadline of the answers, the user may schedule the make-up call with the meeting host. During the make-up call, the user may provide the answers to the meeting host. At 310, the electronic calendar may add a designation that indicates a "flexible reservation" to the make-up call so that the electronic calendar recognizes that this make-update can be rescheduled over other calls with fixed reservations (i.e., tasks that shall be done during a specific date and time). If the user enters a fixed reservation to the entry of the make-up call, the electronic calendar may reschedule the make-up call. Furthermore, if the user enters a fixed reservation to the entry for listening to the recording, the electronic calendar may flexibly reschedule the listening of the recording.

In one embodiment, the user or the electronic calendar receives an on-line electronic meeting invitation. The user or the electronic calendar evaluates entries of the electronic calendar. The user or the electronic calendar determines, based on the evaluation, whether the user can attend the meeting. Upon determining that the user does not attend the meeting, the user or the electronic calendar selects an option on the electronic calendar to have the meeting recorded, e.g., by pressing (or selecting) the icon in response to which the bot appears on a corresponding on-line electronic meeting (software or hardware) tool during the meeting. A host of the meeting finishes the meeting, e.g., by pressing (or selecting) a "finish" button (not shown) on the tool. The bot sends the recording to the electronic calendar of the user. Upon receiving the recording, the electronic calendar identifies user's free time to lock a time period in order for the user to listen the recording.

In one embodiment, an on-line electronic meeting host sends an on-line electronic meeting invitation to the user, e.g., by an email. Then, the user may accepts the invitation, e.g., by clicking "accept" button (not shown) on the email (not shown). The user may specify that the bot may record the meeting, e.g., by sending a communication signal that, upon receipt, makes the bot appear in a corresponding on-line electronic meeting (software or hardware) tool during the on-line electronic meeting on behalf of the user. Once the meeting starts, the bot attends or appears in the on-line electronic meeting on behalf of the user. The bot records the meeting and publishes the recording, e.g., by sending the recording to the user and/or other users via emails. When sending the recording to the user, the bot automatically schedules a time for the user to make the user play the recording.

Figure 3B:
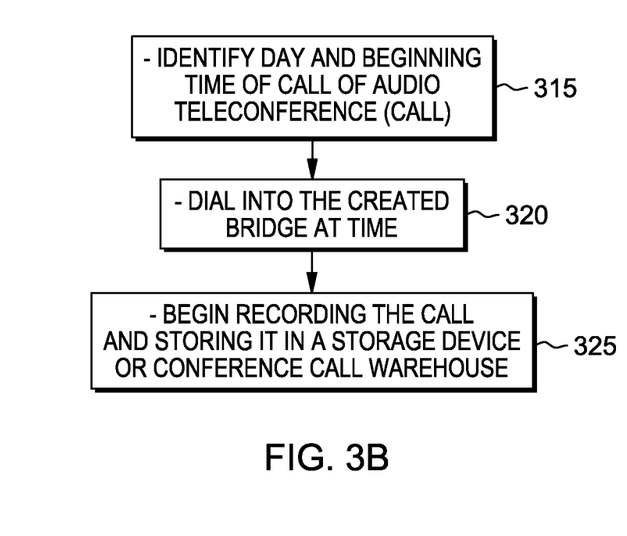
FIG. 3B illustrates a flowchart that describes method steps for automatically recording a conference call in one embodiment.

FIG. 3B illustrates a flowchart that describes method steps for automatically recording a conference call in one embodiment. At 315, the electronic calendar identifies a date and a beginning time of an on-line electronic meeting. At 320, the electronic calendar automatically calls in or connects to a corresponding on-line electronic meeting system. The user sends the communication signal, e.g., by selecting or pressing a specific button (or icon) (not shown) of a corresponding electronic calendar entry of the meeting, to the corresponding on-line electronic system. At 325, the bot records contents of the meeting and stores the recording, e.g., in a data storage device or a web server device, etc., or embeds the recording in a web page.

In one embodiment, the bot may send a keyword of an on-going conference call to a user, e.g., by applying a known electronic summarization technique to the real-time transcript of the on-going conference call. Then, the user determines whether to attend the conference call in the middle of the conference call. In one embodiment, a host of the conference call may turn on or turn off one or more functionalities of the bot, e.g., by disabling an audio recording function of the bot.

In one embodiment, once the bot finishes the recording and the storage of the recording, the bot sends an email to the electronic calendar to update an electronic calendar entry so that entry includes a link to where the recording is stored. At a date and time corresponding to the updated electronic entry, the user opens the electronic calendar entry and clicks on the link. A multi-media player (not shown) automatically pops up and automatically plays the recording. In a further embodiment, the recording can be provided by a file, e.g., MP3 file or accessed via a call in number and listened to over a phone system.

Figure 4:
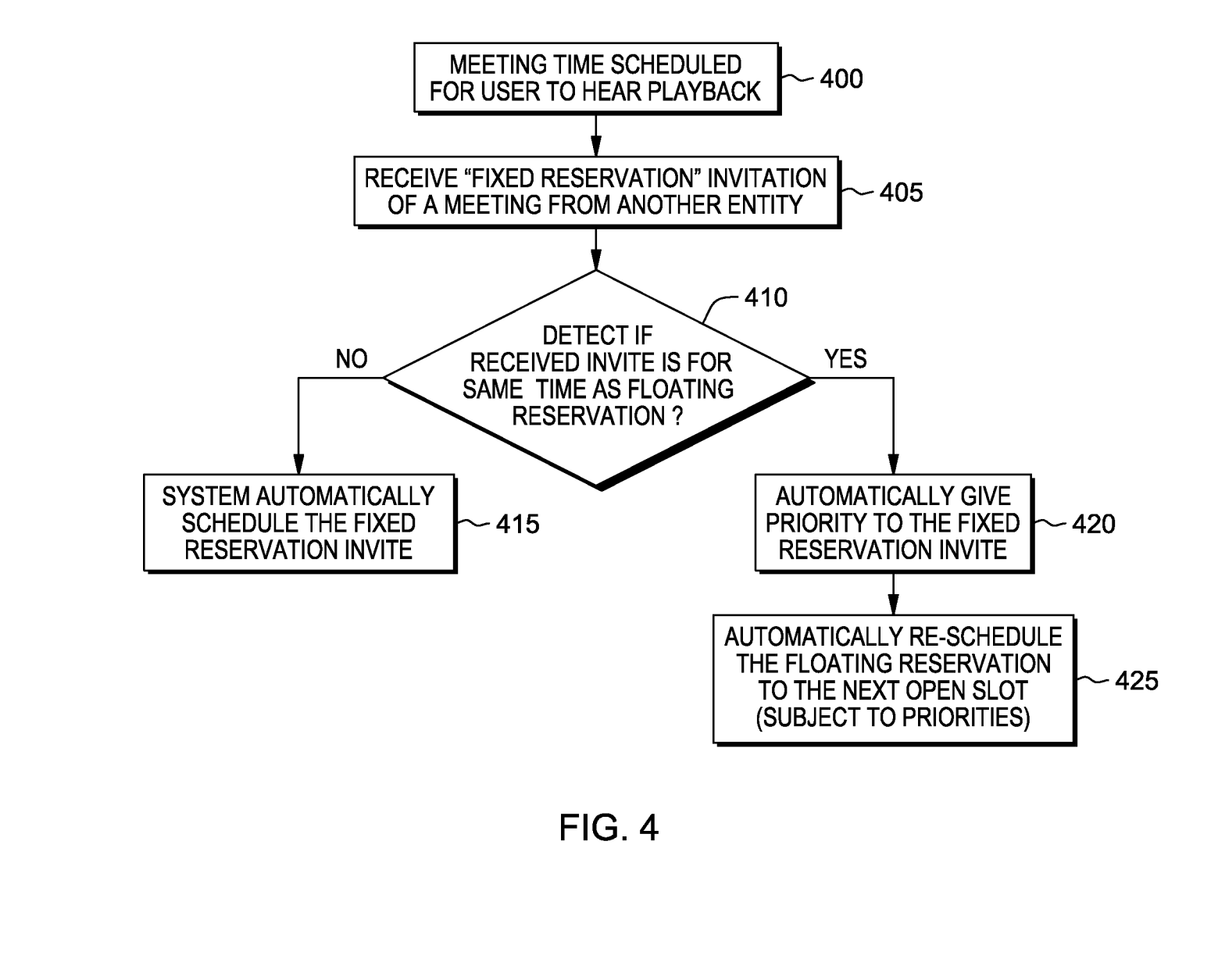
FIG. 4 illustrates a flowchart that describes method steps for rescheduling the flexible calendar entry when there exists a conflict between a fixed electronic calendar entry and the flexible electronic calendar entry in one embodiment.

FIG. 4 illustrates a flowchart that describes method steps for rescheduling the flexible calendar entry when there exists a conflict between a fixed electronic calendar entry and the flexible electronic calendar entry in one embodiment. At 400, assume that the electronic calendar schedules an on-line electronic meeting or an electronic calendar entry for playing the recording. The electronic calendar may add a designation to metadata of a corresponding electronic calendar entry of the scheduled on-line electronic meeting. This metadata may indicate a floating reservation (e.g., a date and time for the on-line meeting can be changed). The electronic calendar may add a designation to metadata of a corresponding electronic calendar entry for the playing the recording. This metadata may indicate the floating reservation (e.g., a date and time for the playing the recording can be changed).

At 405, 410 and 420, if the user receives a fixed reservation request (e.g. an electronic invitation whose date and time cannot be changed) for the same period of time that a floating reservation exists on the electronic calendar, then the electronic calendar may automatically give a higher priority to the fixed reservation invitation. At 425, the electronic calendar reschedules the floating reservation to a next available open slot (according to existing priorities). If there does not exist an overlap between the received fixed reservation invitation and any floating reservation, at 415, the electronic calendar automatically makes an electronic calendar entry for the received fixed reservation request.

In one embodiment, the user may request a real-time text transcription of an on-line electronic meeting to the bot. In this embodiment, the electronic calendar system initiates an instant messaging tool and automatically logs in the instant messaging tool, e.g., by using user's account of the instant messaging tool. The bot appears in a corresponding on-line electronic meeting (software or hardware) tool during the on-line electronic meeting. The bot performs a real-time voice to text conversion on contents of the meeting, e.g., by using a known transcription (or subtitle) software. The bot sends the transcript, in an appropriate length, e.g., via one or more instant messages, etc., to the user. When the meeting is finished, the bot send to the user an email with an entire transcript of the meeting.

In one embodiment, a conferencing system (or the bot) may accept a notification from the user that a corresponding meeting shall be recorded. The conferencing system stores the recording. The conferencing system creates an on-line electronic meeting invitation to the user to hear the recording at user's convenient time. In one embodiment, an on-line electronic meeting host may prevent the bot from appearing or attending a corresponding on-line electronic meeting. The host may specify in an initial meeting invitation whether or not the bot will be accepted during the meeting.

In one embodiment, the conferencing system disables the bot if a corresponding user actually attends the meeting. This disabling of the bot due to the attendance of the user can be implemented by using one or more of: a voice detection of the user during the meeting, integration with caller ID at the conferencing system, and a detection of a caller ID of the user during the meeting, an integration with user's VoIP telephony system, etc.

In one embodiment, a computing system may run the method illustrated in FIGS. 2A-4 and 6. FIG. 5 illustrates examples of the computing system. Examples of the computing system may include, but are not limited to: a parallel computing system 500 including at least one processor 555 and at least one memory device 570, a mainframe computer 505 including at least one processor 556 and at least one memory device 571, a desktop computer 510 including at least one processor 557 and at least one memory device 572, a workstation 515 including at least one processor 558 and at least one memory device 573, a tablet computer 520 including at least one processor 556 and at least one memory device 574, a netbook computer 525 including at least one processor 560 and at least one memory device 575, a smartphone 530 including at least one processor 561 and at least one memory device 576, a laptop computer 535 including at least one processor 562 and at least one memory device 577, a physical server 540 including at least one processor 561 and at least one memory device 578, a software server 580, e.g., web server, HTTP server, application server, or a wearable computer 585, e.g., smartwatch, etc., including at least one processor 590 and at least one memory device 595.

In one embodiment, the methods shown in FIGS. 2A-4 and 6 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the method shown in FIG. 1 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method implemented by a computer for managing a conference call, the conference call having associated therewith, for each participant on the conference call, an indicium displayed on a display mechanism, method comprising:
   receiving, by the computer, invitations of one or more conference calls;
   detecting, by the computer, a conflict between the one or more conference calls and electronic calendar entries;
   displaying by the computer, for a corresponding user each detected conflict;
   receiving by the computer, from the corresponding user, a decision of which of the one or more conference calls the user will attend and which of the one or more conference calls are to be recorded without an attendance of the user when there exists the detected conflict;
   in response to receiving the decision, recording, by a bot operating on the computer, a content of each of the conference calls that the user does not attend, wherein the bot has associated therewith an indicium displayed on the display mechanism and wherein the indicium of the bot is distinct from the indicium that would have been displayed had the user attended each of the conference calls; and
   storing by the computer, in a storage device, the recorded content of the conference calls as one or more files;
   identifying, by the computer, a free time in an electronic calendar to lock a time period for the user to listen to the recording.

2. The method according to claim 1, further comprising:
   sending, by the computer, the recorded conference calls to the corresponding user.

3. The method according to claim 2, wherein the sending includes:
   embedding the one or more files in a corresponding entry of the electronic calendar; or
   making one or more links to the one or more files in the corresponding entry of the electronic calendar.

4. The method according to claim 1, wherein the scheduling includes:
   preventing the recording.

5. The method according to claim 1, wherein the recording includes:
   monitoring whether the corresponding user joined the conference calls that the bot attends.

6. The method according to claim 1, wherein the recording includes:
   automatically calling in conference call numbers of the one or more conference calls.

7. The method according to claim 1, wherein the recording includes:
   configuring the bot that represents the corresponding user to attend the conference calls that the user does not attend;
   performing a real time transcript of the conference calls in which the bot attends; and
   providing the transcript to the corresponding user via one or more instant messages or one or more emails.

8. The method according to claim 1, wherein the scheduling includes:
   deciding, by the corresponding user, whether to temporarily join the conference calls that the bot attends.

9. The method according to claim 1, further comprising:
   scheduling, by the computer, playing of the recording.

10. The method according to claim 9, further comprising:
    flexibly rescheduling, by the computer, the playing of the recording.

11. The method according to claim 10, further comprising:
    examining, by the computer, the electronic calendar; and
    determining, by the computer, whether the corresponding user can attend the one or more conference calls.

12. The method according to claim 10, further comprising:
    giving a priority, by the computer, to a fixed reservation invite over the flexibly rescheduling; and
    rescheduling, by the computer, the flexibly rescheduling to a next available open slot.

13. The method according to claim 1, further comprising:
    automatically triggering, by the computer, an automatic event that initiates the recording.

14. The method according to claim 1, further comprising:
determining, by the computer, what portions of the conference calls which the bot attends are to be recorded.

15. A system for managing a conference call, the conference call having associated therewith, for each participant on the conference call, an indicium displayed on a display mechanism, the system comprising:
a memory device; and
a processor connected to the memory device,
wherein the processor is configured to perform:
receiving invitations of one or more conference calls;
detecting a conflict between the one or more conference calls and electronic calendar entries;
displaying, for a corresponding user, each detected conflict;
receiving, from the corresponding user, a decision of which of the one or more conference calls the user will attend and which of the one or more conference calls are to be recorded without an attendance of the user when there exists the detected conflict;
in response to receiving the decision, recording, by a bot, a content of each of the conference calls that the user does not attend, wherein the bot has associated therewith an indicium displayed on the display mechanism and wherein the indicium of the bot is distinct from the indicium that would have been displayed had the user attended each of the conference calls; and
storing, in a storage device, the recorded content of the conference calls as one or more files;
identifying, by the computer, a free time in an electronic calendar to lock a time period for the user to listen to the recording.

16. The system according to claim 15, wherein in order to record the one or more conference calls, the processor is configured to perform:
configuring the bot that represents the corresponding user to attend the conference calls that the user does not attend;
performing a real time transcript of the conference calls in which the bot attends; and
providing the transcript to the corresponding user via one or more instant messages or one or more emails.

17. The system according to claim 15, wherein the processor is further configured to perform:
embedding the one or more files in a corresponding entry of the electronic calendar; or
making one or more links to the one or more files in the corresponding entry of the electronic calendar.

18. A computer program product for managing a conference call, the conference call having associated therewith, for each participant on the conference call, an indicium displayed on a display mechanism, the computer program product comprising a computer readable storage medium, the computer readable storage medium excluding a propagating signal, the computer readable storage medium readable by a processing circuit and storing instructions run by the processing circuit for performing a method, said method steps comprising:
receiving, by the processing circuit, invitations of one or more conference calls;
detecting, by the processing circuit, a conflict between the one or more conference calls and electronic calendar entries;
displaying, for a corresponding user each detected conflict;
receiving, from a corresponding user, a decision of which of the one or more conference calls the user will attend and which of the one or more conference calls are to be recorded without an attendance of the user when there exists the detected conflict;
in response to receiving the decision, recording, by a bot operating on the processing circuit, a content of each of the conference calls that the user does not attend, wherein the bot has associated therewith an indicium displayed on the display mechanism and wherein the indicium of the bot is distinct from the indicium that would have been displayed had the user attended each of the conference calls; and
storing, in a storage device, the recorded content of the conference calls as one or more files;
identifying, by the computer, a free time in an electronic calendar to lock a time period for the user to listen to the recording.

19. The computer program product according to claim 18, wherein the recording includes:
configuring the bot that represents the corresponding user to attend the conference calls that the user does not attend;
performing a real time transcript of the conference calls in which the bot attends; and
providing the transcript to the corresponding user via one or more instant messages or one or more emails.

* * * * *